United States Patent [19]

Hibino et al.

[11] Patent Number: 4,853,876

[45] Date of Patent: Aug. 1, 1989

[54] PICTURE PRODUCING APPARATUS

[75] Inventors: Chitoshi Hibino, Yamato; Atsushi Arimoto, Isehara; Kenji Yoshihara, Chiba, all of Japan

[73] Assignee: Victor Company of Japan, Ltd., Yokohama, Japan

[21] Appl. No.: 867,235

[22] Filed: May 23, 1986

[30] Foreign Application Priority Data

May 28, 1985 [JP] Japan ................ 60-115045

[51] Int. Cl.⁴ ............................................. G06F 3/14
[52] U.S. Cl. ........................................ 64/518; 371/11; 371/68
[58] Field of Search .............. 340/799, 703, 721, 714, 340/745, 747, 749; 364/521, 737, 131, 518, 522, 900 MS File; 371/68, 63, 11, 9; 358/150, 151, 152

[56] References Cited

U.S. PATENT DOCUMENTS

| | | | |
|---|---|---|---|
| 4,364,037 | 12/1982 | Walker | 340/799 |
| 4,417,336 | 11/1983 | Weilbacker | 371/20 |
| 4,437,092 | 3/1984 | Dean et al. | 340/703 |
| 4,556,955 | 12/1985 | Wright et al. | 364/133 |
| 4,570,217 | 2/1986 | Allen et al. | 364/188 |
| 4,587,605 | 5/1986 | Kouyama et al. | 364/131 |
| 4,635,048 | 1/1987 | Nishi et al. | 340/799 |
| 4,663,619 | 5/1987 | Staggs et al. | 340/799 |
| 4,685,144 | 8/1987 | McCubbrey et al. | 364/131 |
| 4,691,295 | 9/1987 | Erwin et al. | 364/900 |
| 4,713,757 | 12/1987 | Davidson et al. | 364/200 |

FOREIGN PATENT DOCUMENTS 115045 of 1985 Japan .

OTHER PUBLICATIONS

Motorola Appln. Note An 892.
Apple II Reference Manual.

*Primary Examiner*—Gary V. Harkcom
*Assistant Examiner*—Phu K. Nguyen
*Attorney, Agent, or Firm*—Ladas & Parry

[57] ABSTRACT

A picture producing apparatus alternately operates in mutually different first and second time periods, so as to make access to picture information at a high speed and process the picture information in real time. In the first time period, the picture producing apparatus arranges the picture information which is transmitted into a predetermined format, detects and corrects error in the picture information and writes the picture information into a first memory, and reads picture data stored in a second memory. On the other hand, in a second time period, the picture producing apparatus reads the picture information stored in the first memory, and writes the picture data of the picture information into the second memory depending on control data of the picture information.

10 Claims, 12 Drawing Sheets

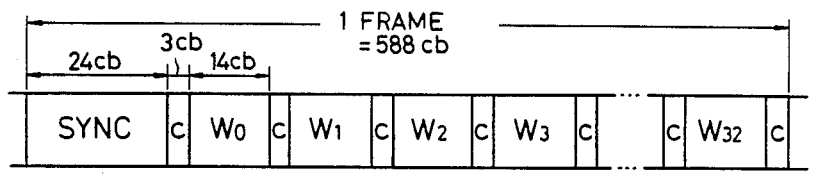
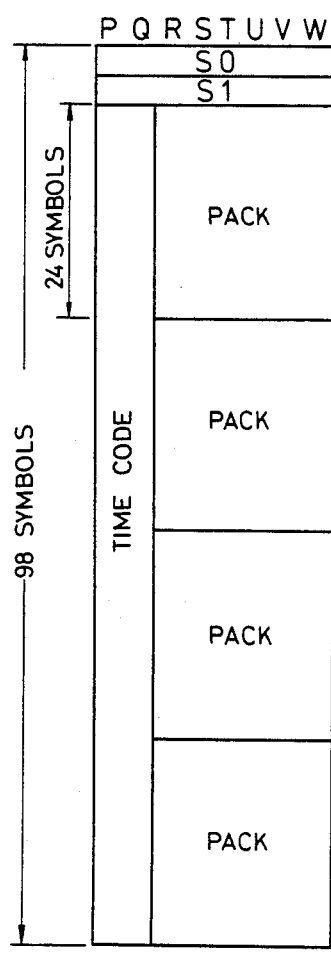
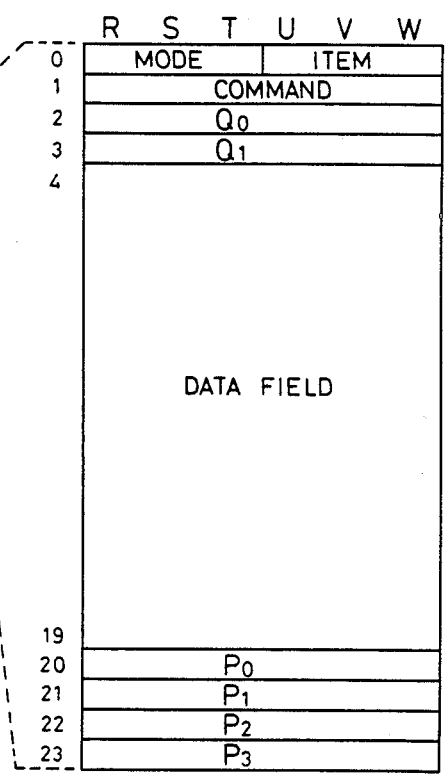

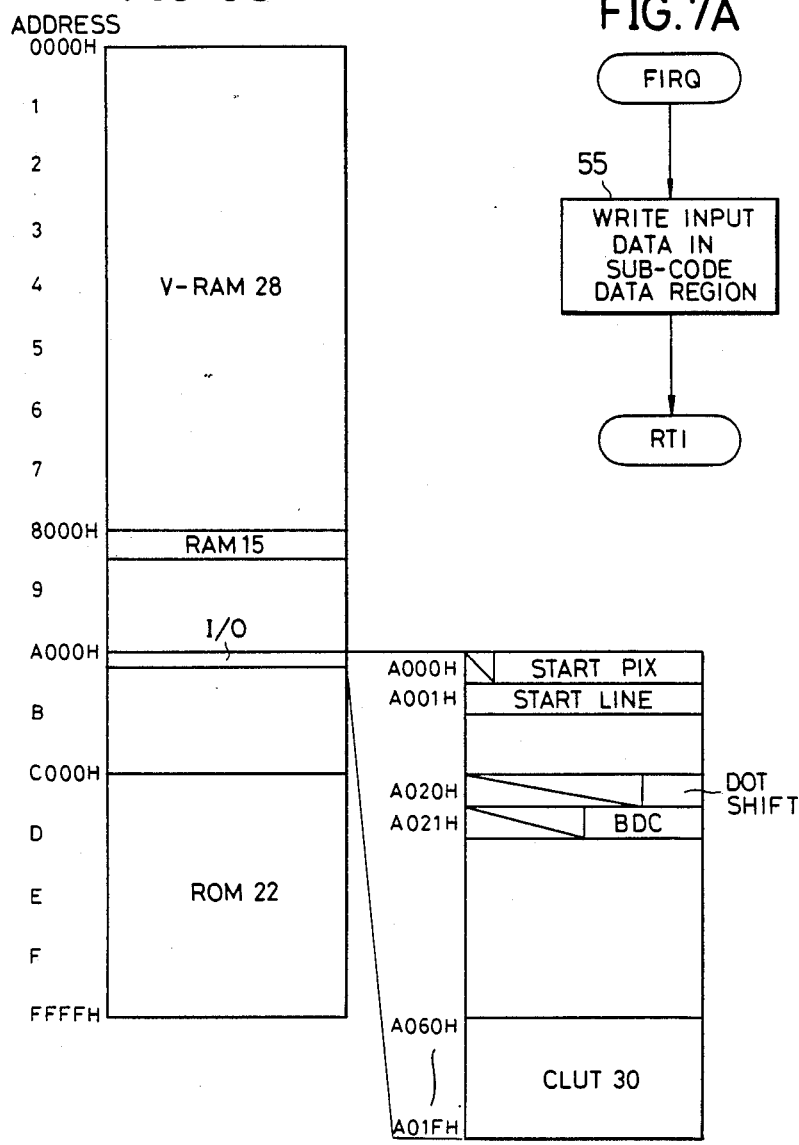
FIG. 6C
FIG. 7A
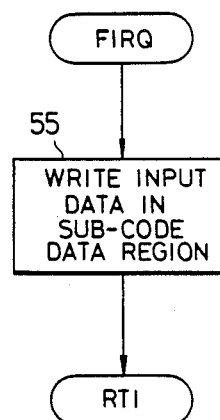

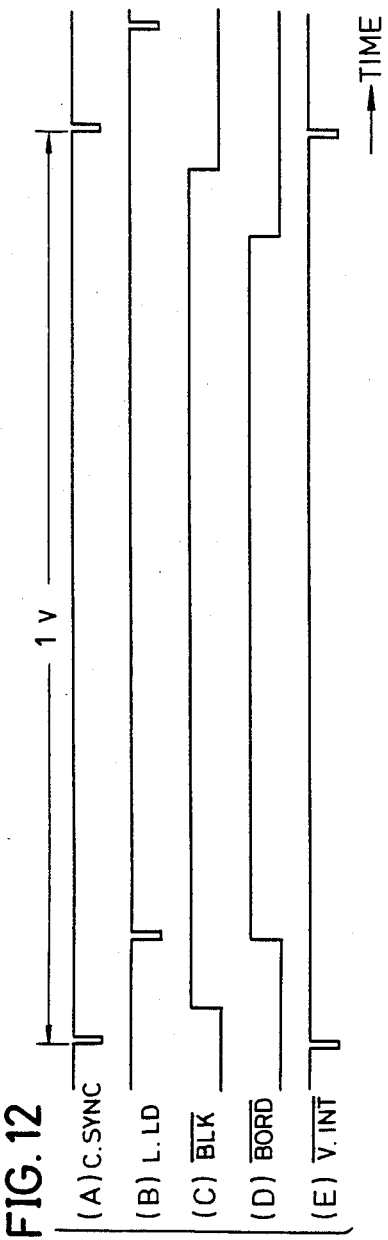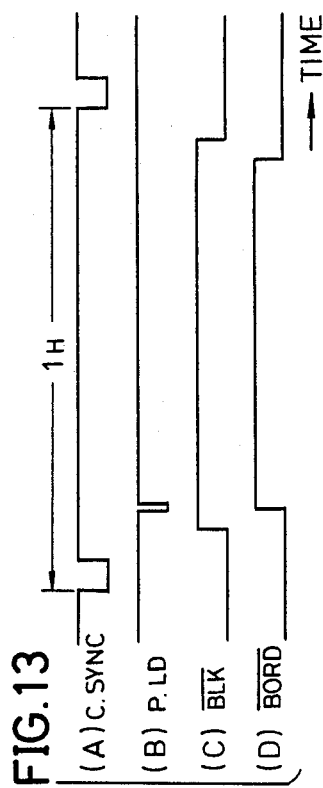

PICTURE PRODUCING APPARATUS

BACKGROUND OF THE INVENTION

The present invention generally relates to picture producing apparatuses, and more particularly to a picture producing apparatus for storing picture data within a picture information which is transmitted in a picture memory and for outputting an analog video signal which is obtained from the picture data read out from the picture memory.

Conventionally, a personal computer is used as a picture producing apparatus. The personal computer decodes commands entered via a keyboard and writes picture data in a video random access memory (hereinafter simply referred to as a V-RAM). Data stored in a color look up table (hereinafter simply referred to as a CLUT) are re-written according to the needs. Primary color signals for displaying a picture are produced from the picture data which are successively read out from the V-RAM. In such a personal computer, the decoding of the commands, the write-in to the V-RAM, the re-wirting of the data in the CLUT and the like are performed by a single central processing unit (CPU). The CPU processes a command only after processing a previous command. Thus, when a certain command is entered while executing a command, the CPU waits until the execution of the command is completed before executing the certain command.

However, sub-codes reproduced from a compact disc on a compact disc player are successively supplied to the picture producing apparatus, and the CPU must de-interleave the sub-codes, detect errors and correct the errors. The conventional picture producing apparatus performs the processing such as the de-interleaving of the sub-codes, the detection of the errors, the correction of the errors, decoding of the commands, the write-in to the V-RAM, the re-writing of the data in the CLUT and the like by use of the single CPU. For this reason, in the case where the incoming commands require clearing of the picture, a scroll-with-present for coloring with a different color an empty portion which is formed by moving the picture and the like, there is a problem in that the CPU cannot process the commands in real time. In addition, in order to reduce the burden on the CPU, a large portion of the write-in process to the V-RAM is performed by hardware, that is, by a device often referred to as a graphic display processor. However, the graphic display processor is originally designed to mainly control the read-out of the picture data from the V-RAM, and for this reason, there is a problem in that the construction thereof becomes complex when the graphic display processor is to perform the additional function of controlling the write-in to the V-RAM.

SUMMARY OF THE INVENTION

Accordingly, it is a general object of the present invention to provide a novel and useful picture producing apparatus in which the problems described heretofore are eliminated.

Another and more specific object of the present invention is to provide a picture producing apparatus comprising a first CPU for arranging an information which is transmitted into a predetermined format, performing an error detection and an error correction to obtain a picture information and writing the picture information into a first memory, a second CPU for decoding control data of the picture information stored in the first memory and writing picture data of the picture information into a second memory, picture data read-out means for successively reading out the picture data stored in the second memory, timing generator means for producing clock signals for the first and second CPUs and the picture data read-out means and a timing signal in synchronism with the clock signals, so that a first operation time period in which the first CPU and the picture data read-out means can operate and a second operation time period in which the second CPU can operate mutually differ, selector means responsive to the timing signal for coupling the first CPU to the first memory and coupling the picture data read-out means to the second memory in the first operation time period and for coupling the second CPU to the first and second memories in the second operation time period, color converting means for converting the picture data read out by the picture data read-out means into color data, and digital-to-analog converter means for converting the color data into an analog video signal. According to the picture producing apparatus of the present invention, the processes such as the detection and correction of errors in the picture information stored in the first memory which are performed by the first CPU and the read-out of the picture data from the second memory which is performed by the picture data read-out means, and the decoding of the control data of the picture information stored in the first memory and the write-in of the picture data into the second memory which are performed by the second CPU are carried out alternately. As a result, the construction of the picture data read-out means becomes simple compared to that of the conventional apparatus. Furthermore, the first and second CPUs and the picture data read-out means can freely make access to the first and second memories without discriminating the operating states thereof, and the picture information can be processed at a high speed. The picture information which is transmitted can thus be processed in real time.

Still another object of the present invention is to provide a picture producing apparatus in which the timing generator means is constituted by an oscillator, a frequency divider for frequency-dividing an output signal of the oscillator, and a phase shifter for shifting the phase of an output signal of the frequency divider. According to the picture producing apparatus of the present invention, it is possible to generate the timing signal and the clock signals for the first and second CPUs and the picture data read-out means with accurate timings.

A further object of the present invention is to provide a picture producing apparatus in which the picture data read-out means is constituted by latch circuit means for latching horizontal and vertical position data from the second CPU, a horizontal counter for loading the horizontal position data from the latch circuit means for every one horizontal scanning period and for counting the clock signal from the timing generator means, a vertical counter for loading the vertical position data from the latch circuit means for every one vertical scanning period, and an operation circuit for producing an address of the second memory by performing a predetermined calculation on counted values in the horizontal and vertical counters. According to the picture producing apparatus of the present invention, it is possible to perform a scroll display in the up-and-down direction and right- and-left direction of the screen.

Another object of the present invention is to provide a picture producing apparatus in which the operation circuit is constituted by a multiplier for multiplying a maximum counted value in the horizontal counter to the counted value in the vertical counter, and an adder for adding the counted value in the horizontal counter to an output value of the multiplier. According to the picture producing apparatus of the present invention, it is possible to minimize the number of bits of the address of the second memory.

Still another object of the present invention is to provide a picture producing apparatus in which the color converting means is constituted by picture data output means for successively outputting for every dot the picture data which amount to four dots and are read out from the second memory in parallel, latch means for holding picture data of a border color, switching means for switching and outputting the picture data from the picture data output means and the picture data of the border color, and color look up table means to which an access is made by the picture data from the switching mean for producing color data. According to the picture data producing apparatus of the present invention, it is possible to read out the picture data amounting to a plurality of dots by making only one access to the second memory. In addition, it is possible to display the border color on the periphery of the displayed picture, and to display a large number of colors by the picture data having a small number of bits.

Other objects and further features of the present invention will be apparent from the following detailed description when read in conjunction with the accompanying drawings.

BRIEF DESCRIPTION OF THE DRAWINGS

FIGS. 2A, 2B and 2C are diagrams for explaining sub-codes;

FIGS. 6A, 6B and 6C are maps respectively showing an embodiment of CPUs and a random access memory in the block system shown in FIG. 1;

FIGS. 7A, 7B and 7C are flow charts for explaining an embodiment of the processes executed by one of the CPUs in the block system shown in FIG. 1;

FIGS. 12(A) through 12(E) and FIGS. 13(A) through 13(D) are time charts respectively showing an embodiment of signals generated in the circuit system shown in FIG. 11;

DETAILED DESCRIPTION

Figure 1:
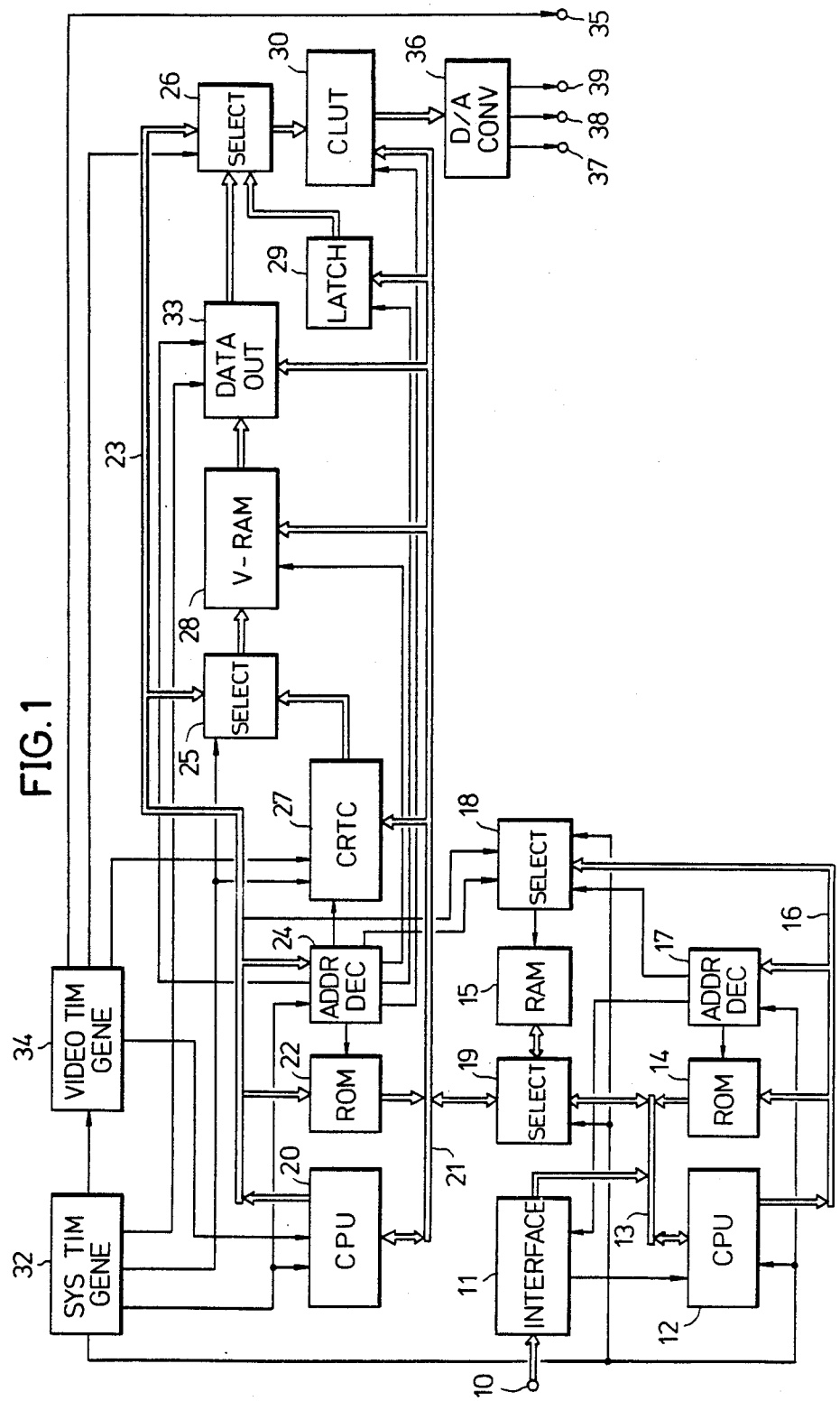
FIG. 1 is a system block diagram showing an embodiment of the picture producing apparatus according to the present invention.

FIG. 1 shows an embodiment of the picture producing apparatus according to the present invention. First, description will be given with respect to the signals which are supplied to the apparatus shown in FIG. 1.

A digital signal is recorded on a compact disc with a frame format shown in FIG. 2A. In FIG. 2A, one frame is made up of 588 channel bits (cb), and a 24-channel bit frame synchronizing signal SYNC is provided at the beginning of the frame. 14-channel bit data $W_0$ through $W_{32}$ are provided subsequent to the frame synchronizing signal SYNC, and a 3-channel bit connecting bit C is provided between the frame synchronizing signal SYNC and the data $W_0$ and between two mutually adjacent data out of the data $W_0$ through $W_{32}$. Each of the 14-channel bit data $W_0$ through $W_{32}$ which have been subjected to an Eight to Fourteen Modulation (EFM) are converted back into 8-bit data when demodulated. Each of the 8-bit data are referred to as a symbol. Out of the data $W_0$ through $W_{32}$, a sub-code of a symbol is recorded in the data $W_0$, and 24-symbol audio data and 8-symbol error correcting data are recorded in the remaining data $W_1$ through $W_{32}$. The bits of one symbol (=8 bits) constituting the sub-code are referred to as P, Q, R, S, T, U, V and W. The bits P and Q are conventionally used as time codes, and the bits R through W are conventionally not used. However, a standard has been decided recently to utilize the bits R through W for graphic display.

As shown in FIG. 2B, one data block is constituted by the symbols amounting to 98 frames, and first two symbols are referred to as sub-code synchronizing codes S0 and S1. The bits P and Q in the remaining 96 symbols are used as the time codes, and each of the bits R through W are divided into four packs of picture information, where each pack comprises 24 symbols. As shown in FIG. 2C, each pack has a zero-th symbol of six bits (bits R through W) indicating the mode and item which describe the utilization states of the bits R through W. A television graphic mode is indicated when the bits of the mode and item are "001 001". A first symbol of six bits contains a graphic display command (instruction) such as clearing of a single color, setting of a border color, display in fonts, scroll, write-in to a color look up table (CLUT) and the like. The second and third symbols respectively of six bits contain error correcting parities Q0 and Q1 for the zero-th and first symbols containing the control data. The fourth through nineteenth symbols respectively of six bits are used as a data field for entering the picture data. For example, in the case where the graphic display command is a command for display in fonts, data related to a background color are entered into the fourth symbol, data related to a frontal color (for example, a color of character) are entered into the fifth symbol, and data related to vertical and horizontal directions in the picture are respectively entered into the sixth and seventh symbols. Picture data amounting to one font constituted by 6×12 dots are entered into the 6-bit eighth through nineteenth symbols, where the six dots are arranged horizontally and the twelve dots are arranged vertically. The picture data include a datum "0" for the background color and a datum "1" for the frontal color, for example. Furthermore, twentieth through twenty-third symbols respectively of six bits contain error correcting parities P0, P1, P2 and P3 for the zero-th through nineteenth symbols.

The interleaved sub-codes which are reproduced from the compact disc on the compact disc player and separated are transmitted to the picture producing apparatus according to the present invention. The picture producing apparatus according to the present invention obtains analog primary color signals from the transmitted sub-codes, and supplies the primary color signals to a monitoring receiver.

Figure 3:
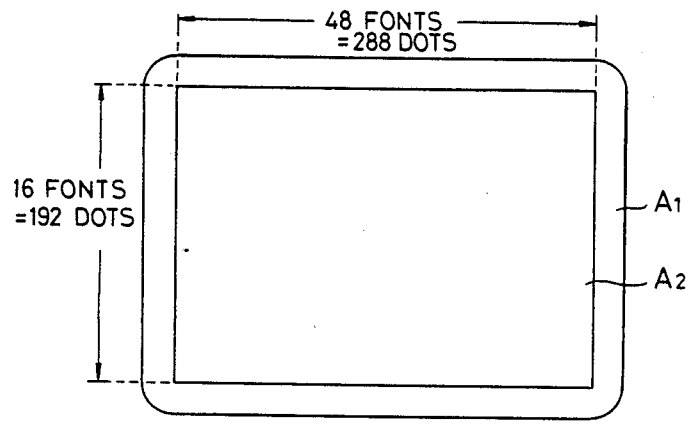
FIG. 3 is a diagram for explaining a displayed picture.

On a screen of the monitoring receiver shown in FIG. 3, a display portion A2 is displayed so that it is surrounded by a border portion A1. The display portion A2 is displayed by 288 dots in the horizontal direction amounting to 48 fonts and 192 dots in the vertical direction amounting to 16 fonts.

Figure 4:
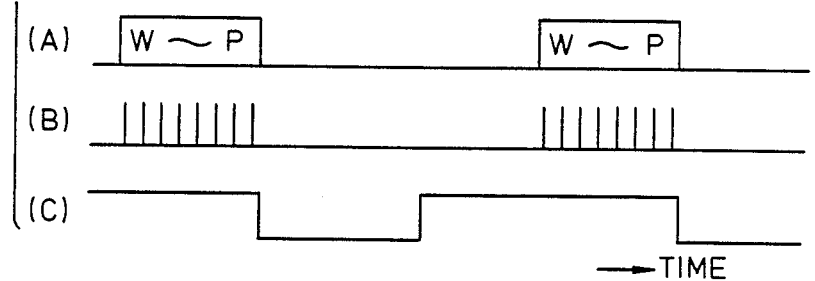
FIGS. 4(A) through 4(C) are time charts for explaining an example of signals supplied to the picture producing apparatus shown in FIG. 1.

In FIG. 1, serial sub-codes (picture information) shown in FIG. 4(A), a bit clock signal shown in FIG. 4(B), a word clock signal shown in FIG. 4(C) and a sub-code synchronizing code detection signal are applied to an input terminal 10 and are supplied to an interface circuit 11.

Figure 5:
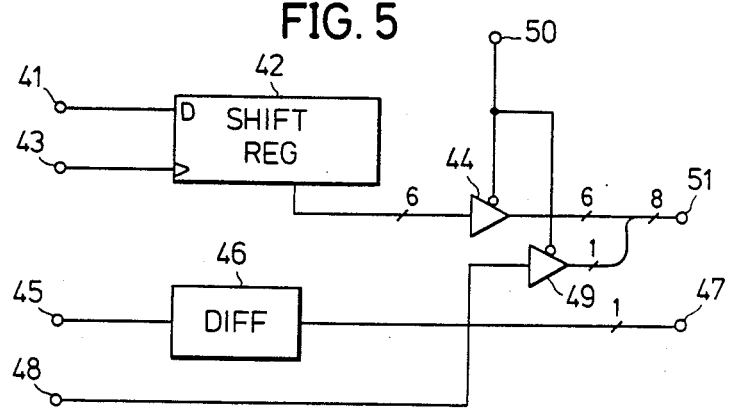
FIG. 5 is a system circuit diagram showing an embodiment of an interface circuit in the block system shown in FIG. 1.

The interface circuit 11 has a construction shown in FIG. 5. In FIG. 5, a sub-code applied to a terminal 41 is supplied to a data input terminal D of a shift register 42. Each bit of the sub-code is shifted within the shift register 42 responsive to a bit clock signal applied to a terminal 43. The 6-bit sub-code which is constituted by the bits R, S, T, U, V and W is latched by the shift register 42, and a 6-bit parallel output is supplied to a tri-state buffer 44. A work clock signal applied to a terminal 45 is supplied to a differentiating circuit 46 which produces a pulse for instructing a falling edge of the word clock signal, that is, a latch termination time of the sub-code. The pulse from the differentiating circuit 46 is supplied to a first CPU 12 via a terminal 47. The pulse supplied to the CPU 12 is used as an interrupt instruction signal.

A sub-code synchronizing code detection signal which has a high level when the sub-code synchronizing codes S0 and S1 shown in FIG. 2B are detected is applied to a terminal 48 and is supplied to a tri-state buffer 49. The CPU 12 produces an address for selecting the interface circuit 11 responsive to the interrupt instruction signal, and an address decoder 17 shown in FIG. 1 which will be described later decodes this address and obtains a control signal. The control signal from the address decoder 17 is applied to a terminal 50 shown in FIG. 5 and is supplied to the tri-state buffers 44 and 49. Accordingly, a 6-bit sub-code comprising the bits R through W is produced from the tri-state buffers 44 and the 1-bit sub-code synchronizing code detection signal is produced from the tri-state buffer 49, and the output signals of the tri-state buffers 44 and 49 are supplied to the CPU 12 from a terminal 51 via a data bus 13 shown in FIG. 1. Since the data bus 13 comprises eight bits, one of the eight bits of the data bus 13 is not used.

Figure 6A:
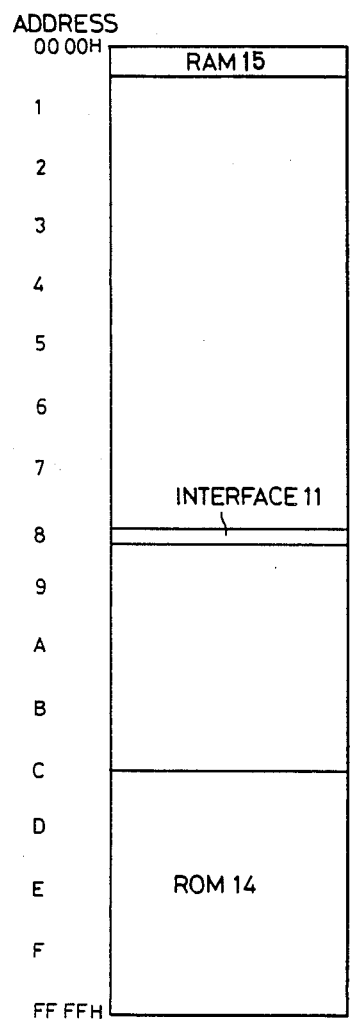

The CPU 12 executes programs stored in a read only memory (ROM) 14, and a random access memory (RAM) 15 is used as a first memory constituting an operating region. A 16-bit address produced from the CPU 12 is passed through an address bus 16 and is supplied to the ROM 14, the address decoder 17 and a selector 18. The address of the CPU 12 is constituted as shown in FIG. 6A, and is used to make access to the RAM 14, the interface circuit 11 and the RAM 15. The address decoder 17 decodes the address, discriminates to which one of the interface circuit 11, the ROM 14 and the ROM 15 the access is made, and supplies control signals to the interface circuit 11, the ROM 14 and the RAM 15. For example, the address decoder 17 and an address decoder 24 which will be described later are constituted by a programmable logic device (PLD) PAL16L8 and devices LS138 and LS139. For example, the selector 18 is constituted by three devices LS157. The selector 18 switches and supplies to the RAM 15 the control signal and the address of the CPU 12 or the control signal and the address of a CPU 20 which will be described later. For example, a selector 19 is constituted by two devices LS245. The RAM is coupled either to the bi-directional data bus 13 or a bi-directional data bus 21 by the selector 19.

Figure 6B:
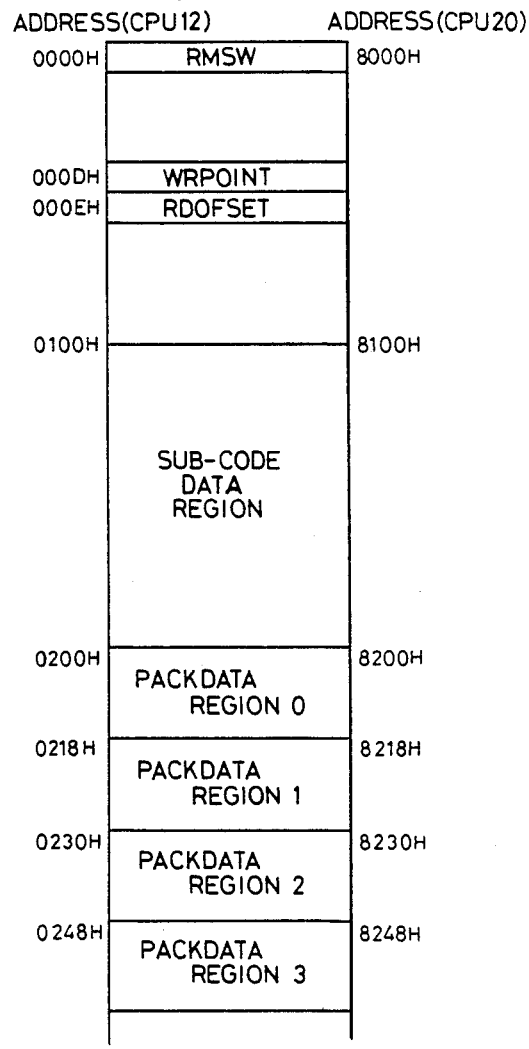

For example, a device 68B09E is used for the CPU 12. The CPU 12 executes the interrupt process shown in FIG. 7A every time the interrupt instruction signal is received from he interface circuit 11. In FIG. 7A, a step 55 successively writes into a sub-code data region of the RAM 15 each of the six bits constituting the symbols obtained from the interface circuit 11 via the data bus 13. In a memory map shown in FIG. 6B, and address on the left indicates the hexadecimal address the CPU 12 uses to make access to the RAM 15, and an address on the right indicates the hexadecimal address the CPU 20 uses to make access to the RAM 15.

Figure 7B:
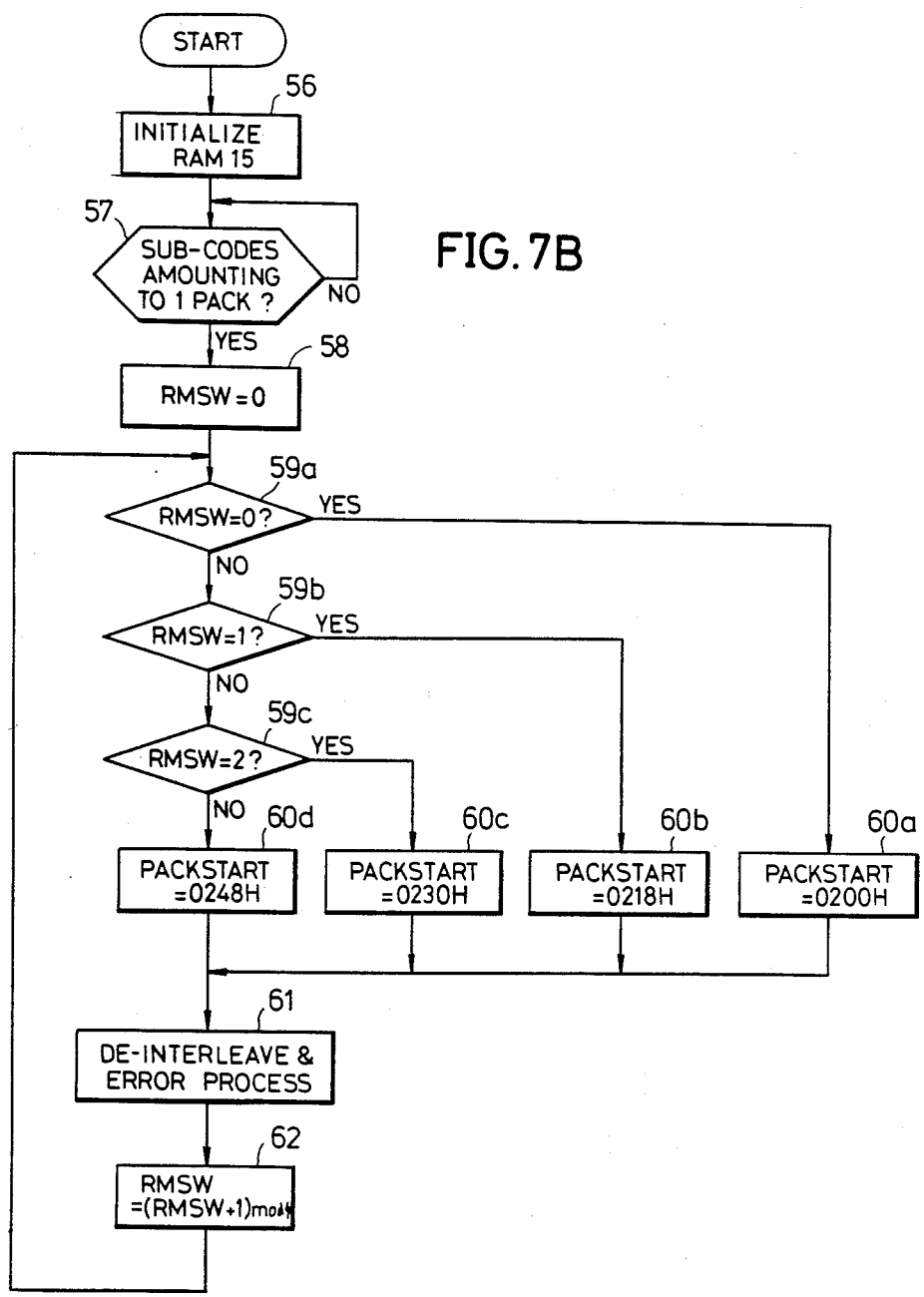

As shown in FIG. 7B, the CPU 12 performs the initializing of the RAM 15 in a step 56. A step 57 discriminates whether or not sub-codes amounting to one pack (=24 symbols) have been written into the sub-code date region of the RAM 15 by the interrupt process described before. When the discrimination result in the step 57 becomes YES, a step 58 sets a variable RMSW to "0".

Steps 59a, 59b and 59c discriminate the value of the variable RMSW, and steps 60a, 60b60c and 60d are executed depending on the discrimination results in the steps 59a, 59b and 59c so as to determine a transfer address of the picture information which is obtained by processing the sub-codes.

Thereafter, a step 61 performs the de-interleaving and the error correcting processes on the sub-codes and writes the picture information which is obtained into one of pack data regions 0 through 3 of the RAM 15. A step 62 increments the value of the variable RMSW and obtains a new value for the variable RMSW by performing a modulo-four operation. The operation is then returned to the step 59a.

Figure 7C:
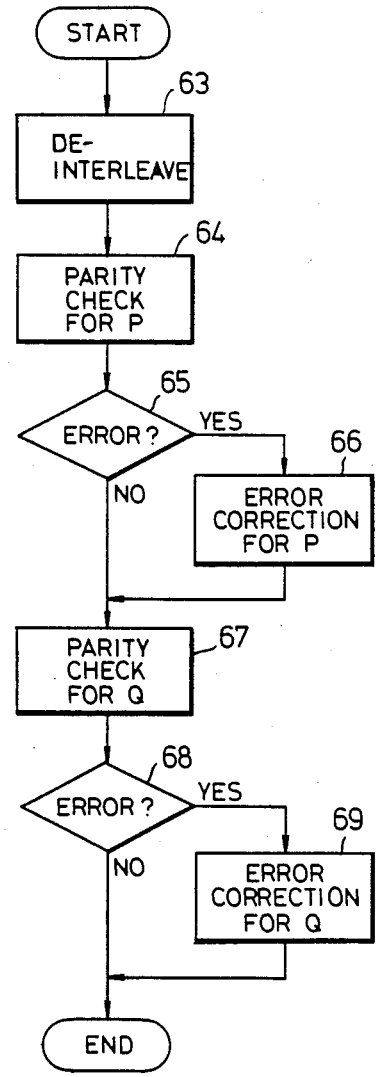

The de-interleaving and error correcting processes are shown in FIG. 7C. First, the CPU 12 de-interleaves the sub-codes in the sub-code data region amounting to one pack and converts the sub-codes into a format shown in FIG. 2C in a step 63. A step 64 performs a parity check for P to detct the error in the zero-th through nineteenth symbols by use of the parities P0 through P3 of the twentieth through twenty-third symbols. A step 65 discriminates whether or not there is an error as a result of the P-parity check performed in the step 64. When the discrimination result is the step 65 is YES, a step 66 corrects the errror by use of the parities P0 through P3. The operation advances to a step 67 when the discrimination result in the step 65 is NO and also after the step 66 is performed. The step 67 performs a parity check for Q to detect the error in the zero-th and first symbols by use of the parities Q0 and Q1 of the second and third symbols. A step 68 discriminates whether or not there is an error as a result of the Q-parity check performed in the step 67. When the discrimination result in the step 68 is YES, a step 69 corrects the error by use of the parities Q0 and Q1. The de-interleaving and error correcting processes are ended when the discrimination result in the step 68 is NO and also after the step 69 is performed.

The second CPU 20 decodes the command of the picture information. For example, a device 68B09E is used for the CPU 20. The CPU 20 executes programs stored in a ROM 22. A 16-bit address produced from the CPU 20 is passed through an address bus 23 and is supplied to the ROM 22, the address decoder 24, the selector 18 and selectors 25 and 26. The address of the CPU 20 is constituted as shown in FIG. 6C. The address of the CPU 20 is used to make access to a V-RAM 28, the RAM 15, a horizontal position START PIX and a vertical position START LINE of a CRT controller (hereinafter simply referred to as a CRTC) 27, a timing instruction DOT.SHIFT of a picture data output circuit 33, and a border latch circuit (hereinafter simply referred to as a BDC) 29. The address decoder 24 decodes the address and produces control signals which are supplied to the ROM 22, the RAM 15, the CRTC 27 which is a memory control circuit, the V-RAM 28, the border latch circuit 29, a CLUT 30 and the picture data output circuit 33 to control these circuit elements.

Figure 8:
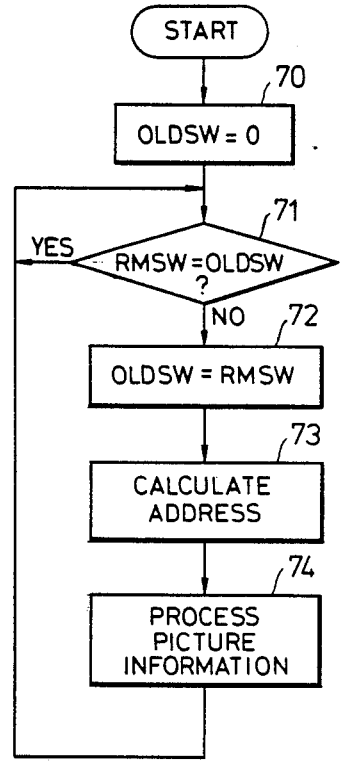
FIG. 8 is a flow chart for explaining an embodiment of the processes executed by the other of the CPUs in the block system shown in FIG. 1.

The CPU 20 executes the processes shown in FIG. 8. First, the CPU 20 sets a variable OLDSW to "0" in a step 70. A step 71 discriminates whether or not the value of the variable OLDSW is equal to the value of the variable RMSW set in the CPU 12. When the discrimination result in the step 71 in NO, that is, when the de-interleaving and the error correcting processes on the sub-codes amounting to one pack in the CPU 12 are ended, a step 72 sets the value of the variable OLDSW to the value of the variable RMSW. A step 73 uses the value of the variable OLDSW to calculate the address of the pack data region within the RAM 15 where the picture information after the de-interleaving and the error correcting processes is stored. A step 74 executes a picture information process, and the operation is returned to the step 71.

The step 74 reads out from the RAM 15 the picture information amounting to one pack and supplies this picture information to the CPU 20 via the selector 19 and the data bus 21. The CPU 20 decodes the zero-th and first symbols which are the control data of the sub-codes corresponding to the one pack.

When the decoded command instructs the display in fonts, for example, the CPU 20 writes into a designated address of the V-RAM 28 via the data bus 21 the picture data which amount to one font and are described by each of the six bits of the fourth through nineteenth symbols shown in FIG. 2C. In the case where the command instructs the border color setting, the BDC 29 latches a 4-bit data instructing the border color. On the other hadn, in the case where the command instructs the write-in to the CLUT 30, the table contents designated address of the CLUT 30 are re-written. Furthermore, when the command instructs a scroll, an initial value of a read-out address of the V-RAM 28 is set in the CRTC 27.

Figure 9:
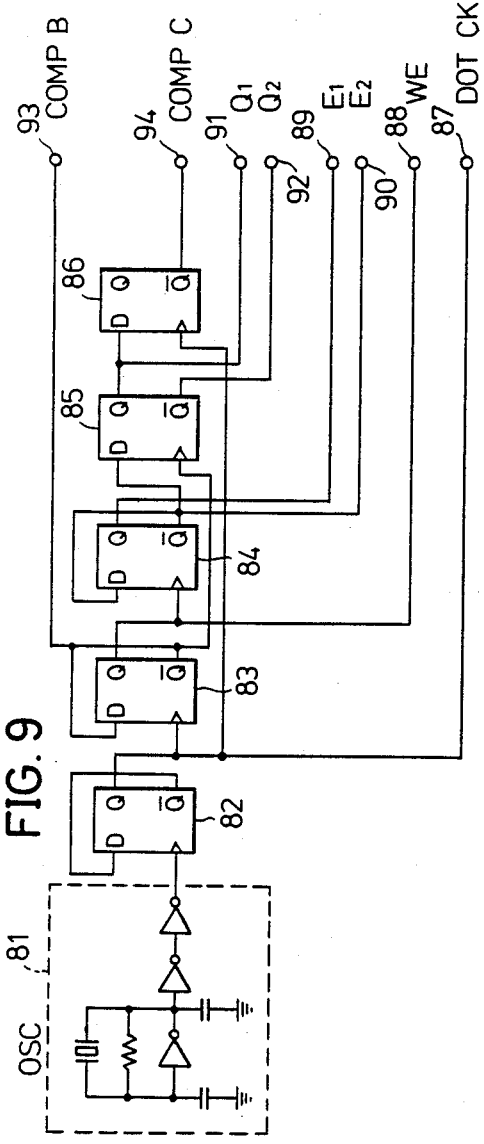
FIG. 9 is a system circuit diagram showing an embodiment of a system timing generator in the block system shown in FIG. 1.

A system timing generator 32 has a construction shown in FIG. 9. In FIG. 9, an oscillator 81 generates a master clock signal shown in FIG. 10(A) having a frequency of 14.31818 MHz. The master clock signal is successively frequency-divided by 1/2 in the flip-flops 82, 83 and 84, and signals shown in FIGS. 10(B), 10(C) and 10(D) are obtained from respective Q-output terminals of the flip-flops 82, 83 and 84.

Figure 10:
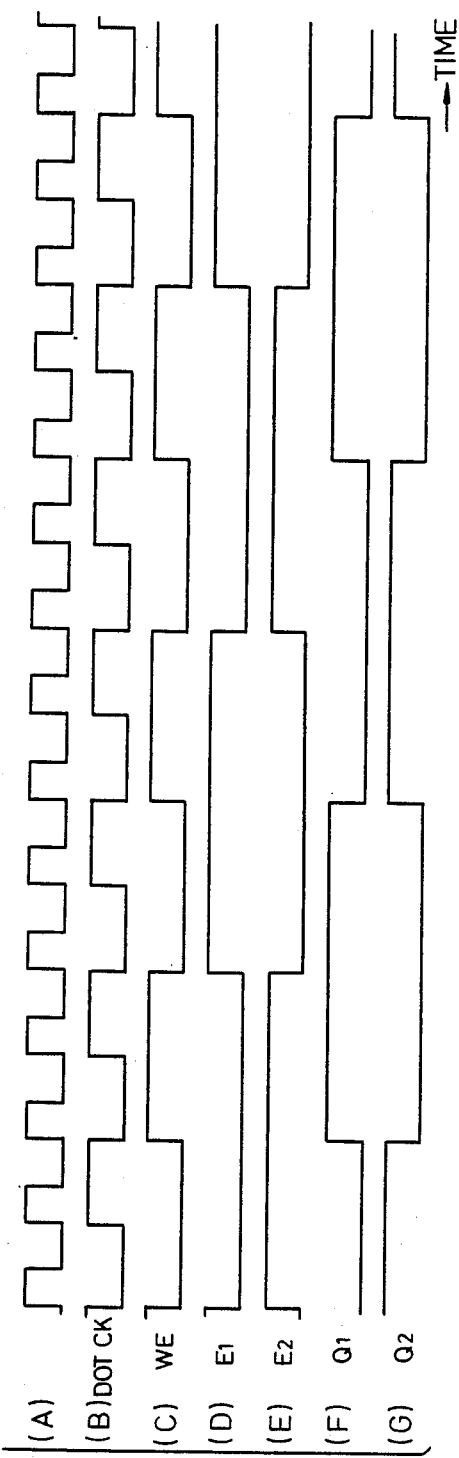
FIGS. 10(A) through 10(G) are time charts for explaining an embodiment of signals generated in the circuit system shown in FIG. 9.

The signal shown in FIG. 10(B) is outputted via a terminal 87 as a dot clock signal DOT.CK, and the signal shown in FIG. 19(C) is outputted via a terminal 88 as a write enable signal WE. The signal shown in FIG. 10(D) is outputted via a terminal 89 as a clock signal E1. A signal shown in FIG. 10(E) obtained from a $\overline{Q}$-output terminal of the flip-flop 84 is outputted via a terminal 90 as a clock signal E2. A flip-flop 85 delays the clock signal E2 by 90°, and signals shown in FIGS. 10(F) and 10(G) are respectively obtained from a Q-output terminal and a $\overline{Q}$-output terminal of the flip-flop 85. The signal shown in FIG. 10(F) is outputted from a terminal 91 as a clock signal Q1, and the signal shown in FIG. 19(G) is outputted via a terminal 92 as a clock signal Q2.

In addition, a signal obtained from a $\overline{Q}$-outputted terminal of the flip-flop 83 is outputted via a terminal 93 as a timing signal compB. A flip-flop 86 shifts the phase of the clock signal Q1, and a signal obtained from a $\overline{Q}$-output terminal of hte flip-flop 86 is outputted via a terminal 94 as a timing signal compC.

The clock signals E1 and Q1 are supplied to the CPU 12 and the address decoder 17, and the clock signals E2 and Q2 are supplied to the CPU 20 and the address decoder 24. The system timing generator 32 supplies to the CRTC 27 a clock signal identical to the clock signal E1 for the CPU 12, where one period of this clock signal corresponds to four dots. In addition, the system timing generator 32 supplies the clock signal E2 to the selectors 18, 19 and 25 as a switching signal. The write enable signal WE is passed through the address decoders 17 and 24 and is supplied to the RAM 15 and the V-RAM 28, respectively. The system timing generator 32 also supplies the dot clock signal DOT.CK and the timing signals compB and compC to the picture data output circuit 33, and supplies the timing signal compC to a video timing generator 34.

Figure 11:
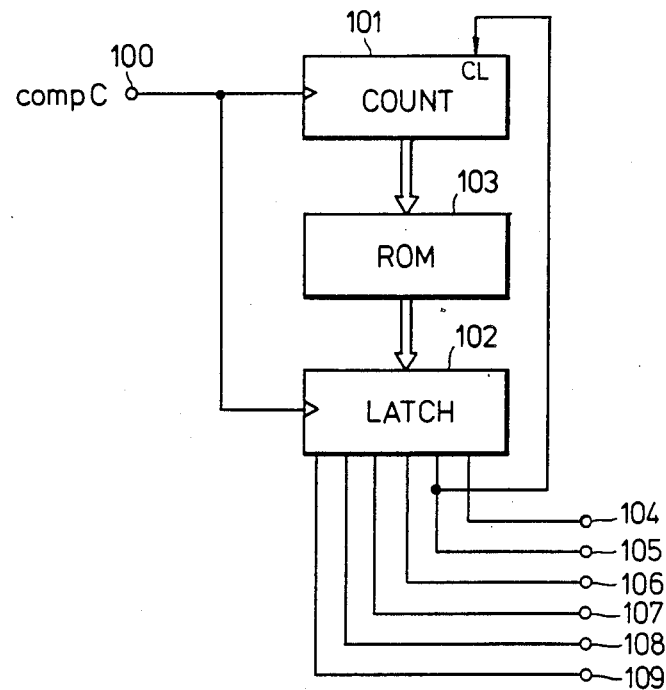
FIG. 11 is a system circuit diagram showing an embodiment of a video timing generator in the block system shown in FIG. 1.

The video timing generator 34 has a construction shown in FIG. 11. In FIG. 11, the timing signal compC is applied to a terminal 100 and is supplied to clock input terminals of a counter 101 and a latch circuit 102. The counter 101 counts the timing signal compC and supplies a 15-bit counted value to a ROM 103. For example, the ROM 103 is a 32 kilobyte erasable programmable ROM (EPROM) 27256. The counted value is used as an address to make access to the ROM 103 so as to generate various timing signals. The various timing signals from the ROM 103 are latched in the latch circuit 102 and are outputted via terminals 104 through 109. A clear pulse is generated from the ROM 103 every time the counted value becomes "29868" in decimal corresponding to one vertical scanning period, and this clear pulse is passed through the terminal 105 of the latch circuit 102 and is supplied to a clear terminal CL of the counter 101 so as to clear the counter 101.

A composite synchronizing signal C.SYNC shown in FIGS. 12(A) and 13(A) is obtained from the terminal 104. The clear pulse shown in FIG. 12(B) which becomes a load pulse L.LD for the vertical counter of the CRTC 27 is obtained from the terminal 105. A load pulse P.LD shown in FIG. 13(C) for the horizontal counter of the CRTC 27 is obtained from the terminal 106. A signal $\overline{BLK}$ shown in FIGS. 12(C) and 13(C) for instructing a scanning period is obtained from the terminal 107. A border signal $\overline{BORD}$ shown in FIGS. 12(D) and 13(D) for instructing a real picture display is obtained from the terminal 108. Furthermore, a signal $\overline{VNT}/$ shown in FIG. 12(E) for instructing a blanking period to the CPU 20 is obtained from the terminal 109.

Figure 14:
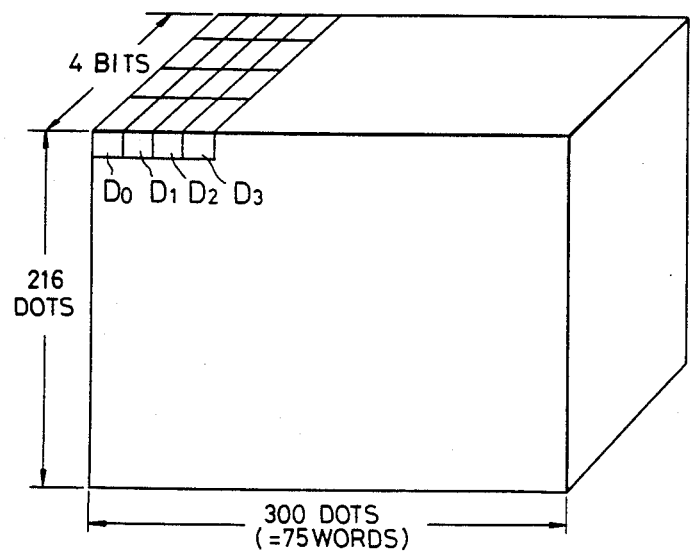
FIG. 14 is a diagram for explaining stored states of picture data in a V-RAM in the block system shown in FIG. 1.

As shown in FIG. 14, the V-RAM 28 stores the picture data amounting to 300 dots in the horizontal direction and 216 dots in the vertical direction of the screen shown in FIG. 3. Out of the picture data amounting to 300×216 dots, the picture data amounting to 288×192 dots are displayed in the display portion A2 shown in FIG. 3. The picture data in excess of the picture data required to display in the display protion A2 are stored for the purpose of carrying out the scroll. The picture data amounting to one dot are constituted by four bits, and the address is assigned to one word with amounts to four dots and comprises sixteen bits. In other words, 16-bit picture data related to dots D0 through D4 shown in FIG. 14 are stored at the address 0 of the V-RAM 28.

When writing the picture data into the V-RAM 28 by the CPU 20, the 8-bit picture data (amounting to two dots) supplied via the data bus 21 are written at a position specified by the address supplied from the address bus 23 via the selector 25 and by the control signal from the address decoder 24 indicating the upper or lower eight bits. In addition, the read-out of the picture data from the V-RAM 28 is preformed for each address in units of the 16-bit word.

Figure 15:
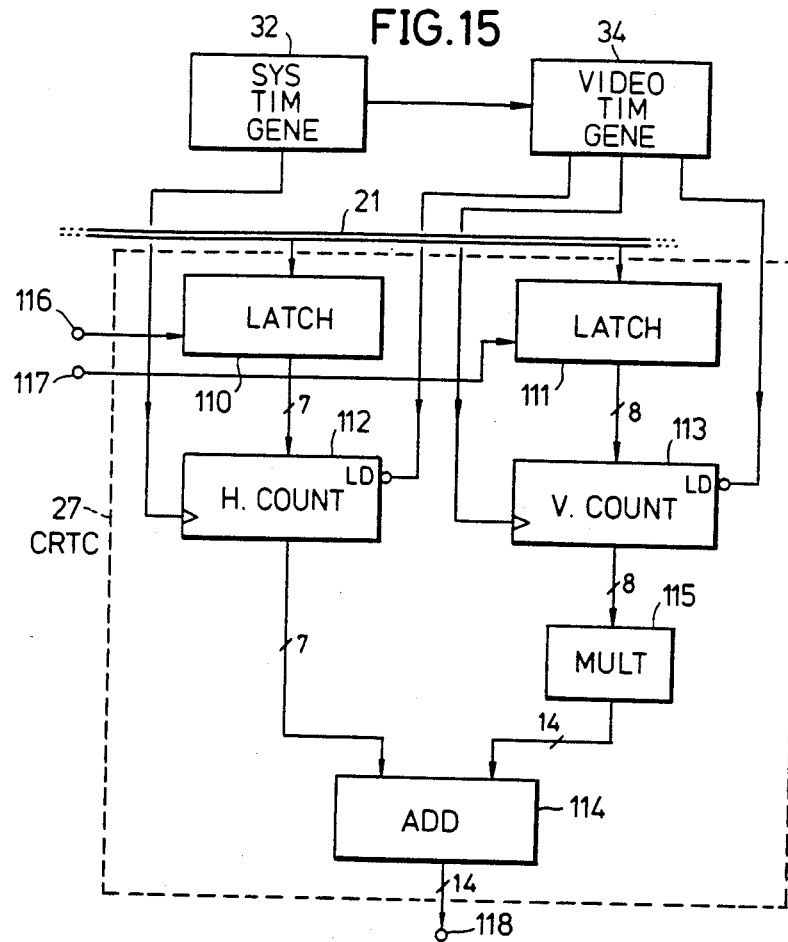
FIG. 15 is a circuit diagram showing an embodiment of a cathode ray tube controller in the block system shown in FIG. 1.

The CRTC 27 which is a memory control circuit has a construction shown in FIG. 15. In FIG. 15, the CRTC 27 is constituted by latch circuits 110 and 111, a horizontal counter 112, a vertical counter 113, an adder 114 and a multiplier 115. When the control signal from the address decoder 24 instructing a latch is applied to a terminal 116 and is supplied to the latch circuit 110, the latch circuit 110 latches the 7-bit horizontal position data which is supplied thereto from the CPU 20 via the data bus 21. In addition, when the control signal from the address decoder 24 instructing a latch is applied to a terminal 117 and is supplied to the latch circuit 111, the latch circuit 111 latches the 8-bit vertical position data which is supplied thereto from the CPU 20 via the data bus 21. In a normal state where no scroll is instructed, the value in the latch circuit 110 is "1" in decimal and the value in the latch circuit 111 is "12" in decimal. These values in the latch circuits 110 and 111 are varied when performing the scroll.

The horizontal counter 112 is a 75-count counter, and loads the horizontal position data supplied from the latch circuit 110 when the load pulse P.LD from the video timing generator 34 is supplied to the horizontal counter 112. The load pulse P.LD has the horizontal scanning frequency and has a predetermined phase delay compared to the horizontal synchronizing signal. Thereafter, the horizontal counter 112 counts the clock signal E1 from the system timing generator 34 which has a rate of one pulse for four dots in correspondence withe the display speed in the horizontal direction. The load pulse P.LD corresponds to a starting portion (left end) in the horizontal direction of the display poriton A2 on the screen shown in FIG. 3. Accordingly, when a value "20" in decimal is loaded into the horizontal counter 112 as the horizontal position data during the scroll, for example, the count is started from the value "20" from the time when the clock signal E1 is received. The count becomes "0" after a counted value "74", and the count is continued until a value "19".

The vertical counter 113 is a 216-count counter, and loads the vertical position data supplied from the latch circuit 111 when the load pulse L.LD from the video timing generator 34 is supplied to the vertical counter 113. The load pulse L.LD has the vertical scanning frequency and is delayed by a predetermined number of horizontal scanning periods compared to the vertical synchronizing signal. Thereafter, the vertical counter 113 counts the load pulse L.LD from the system timing generator 34 which has the horizontal scanning frequency. The load pulse L.LD corresponds to a starting position (upper end) in the vertical direction of the display portion A2 on the screen shown in FIG. 3. Accordingly, when a value "100" in decimal is loaded into the vertical counter 113 as the vertical position data during the scroll, for example, the count is started from the value "100" from the time when the load pulse P.LD is received. The count becomes "0" after a counted value "215", and the count is continued until a value "99".

The 8-bit counted value from the vertical counter 113 is supplied to the multiplier 115. The multiplier 115 multiplies "75" to the output counted value of the vertical counter 113, and the multiplier 115 is constituted by a ROM which pre-stores output values in correspondence with input values, for example. In this case, the value "75" is a maximum counted value of the horizontal counter 112 which counts from "0" to "74" in decimal. It is of course possible to constitute the multiplier 115 by a programmable logic array (PLA), an adder and the like. Since a maximum counted value in the vertical counter 113 is "215" in decimal, the multiplier 115 produces a value described by a 14-bit signal. The output value of the multiplier 115 is added to the output value of the horizontal counter 112 in the adder 114. A 14-bit read-out address of the V-RAM 28 produced from the adder 114 is outputted via a terminal 118.

The address outputted by the CRTC 27 is supplied tothe V-RAM 28 via the selector 25, and as decribed before, the 16-bit picture data amounting to four dots are read out in parallel from the V-RAM 28. The read out picture data are supplied to the picture data output circuit 33.

Figure 16:
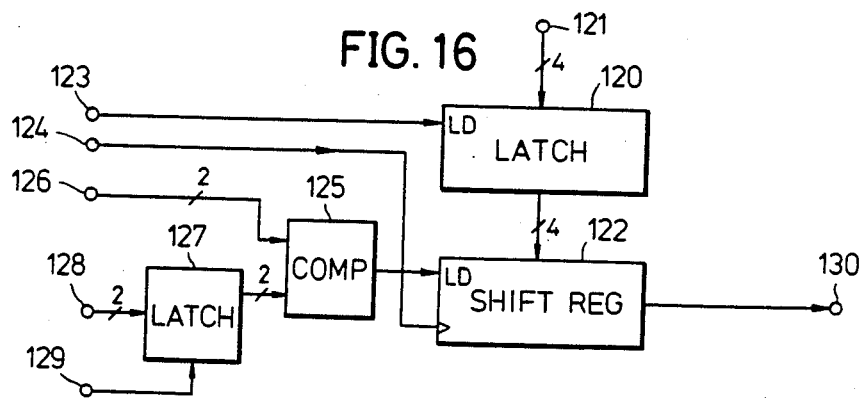
FIG. 16 is a system circuit diagram showing an embodiment of a picture data output circuit in the block system shown in FIG. 1.

The picture data output circuit 33 has a construction shown in FIG. 16. In FIG. 16, out of the 16-bit picture data amounting to four dots which are read out from the V-RAM 28, a 4-bit data made up of one bit of each of the four dots are applied to a terminal 121 and are supplied to a latch circuit 120. The bits of the 4-bit data are arranged so that one bit related to the dot D0 occupies the most significant bit (MSB) and one bit related to the dot D3 occupies the least significant bit (LSB). Actually, four of such latch circuits 120 (only one shown) and four shift registers 122 (only one shown) which will be described later are provided. Hence, each of the latch circuits 120 and a corresponding one of the shift registers 122 perform a serial-to-parallel conversion of the 4-bit data made up of one bit of each of the four dots. The clock signal E2 from the system timing generator 32 is supplied to the latch circuit 120 via a terminal 123 so as to latch the 4-bit data. The 4-bit data latched in the latch circuit 120 are supplied to the shift register 122. The dot clock signal DOT.CK from the system timing generator 32 is supplied to the shift register 122 via a terminal 124, further, a load pulse from a comparator 125 is also supplied to the shift register 122.

The timing signals compB and compC amounting to two bits which are obtained from the system timing generator 32 are applied to a terminal 126 and are supplied to the comparator 125. 2-bit timing instruction data DOT.SHIFT from the CPU 20 are applied to a terminal 128 via the data bus 21 and are supplied to a latch circuit 127. When the address of the CPU 20 has a value instructing the picture data output circuit 33, a latch signal from the adress decoder 24 is applied to a terminal 129 and the timing instruction data DOT.-SHIFT are latched in the latch circuit 127 and are constantly supplied to the comparator 125. The comparator 125 compares the timing signals compB and compC of two bits and the timing instruction data DOT.SHIFT of two bits and produces the load pulse when the two signals coincide. This load pulse from the comparator 125 is supplied to the shift register 122. The shift register 122 enters the 4-bit data from the latch circuit 120 responsive to the load pulse, and successively produces the entered data from the MSB by shifting the data responsive to the dot clock signal DOT.CK. The serial data produced from the shift register 122 are outputted via a terminal 30. The serial data from the terminal 130 and the serial data produced from the three other shift registers constitute 4-bit parallel picture data amounting to one dot. The 4-bit parallel picture data are supplied to the selector 26.

In other words, the circuit shown in FIG. 16 constitutes a variable length shift register which varies the data output timing of the shift register 122 by varying the timing of the load pulse for the shift register 122 with respect to the clock signal E2 depending on the timing instruction data from the CPU 20. Accordingly, although the picture data are read out from the V-RAM 28 in units of four dots, it is possible to perform a horizontal scroll in units of one dot.

For example, the selector 26 is constituted by two devices LS153. Based on the border signal $\overline{BORD}$ from the video timing generator 34, the selector 26 obtains 4-bit picture data related to the border color which is supplied from the border portion A1 is displayed on the screen in FIG. 3, and obtains the 4-bit picture data from the picture data output circuit 33 during the time period in which the display portion A2 is displayed on the screen in FIG. 3. For example, the border latch circuit 29 is constituted by a device LS174. The picture obtained from the selector 26 are supplied to the CLUT 30 as the read-out address. During the vertical blanking period of the picture which is instructed by the signal $\overline{BLK}$, a 4-bit address is obtained from the address bus 23 and is supplied to the CLUT 39 as the write-in address.

The CLUT 30 has a 4-bit address, and is constituted by a RAM which stores 12-bit color data at each address, that is, three kinds of 4-bit primary color data related to the three primary colors of red (R), green (G) and blue (B). For example, the CLUT 30 is constituted by three devices LS189. An access may be made to the three kinds of 4-bit primary color data at each address of the CLUT 30 during the vertical blanking period so as to re-write the 4-bit primary color data. During the vertical scanning period, the access is made to the CLUT 30 by the 4-bit picture data supplied from the selector 26 so as to read out the color data. The read out color data made up of the three kinds of 40-bit data related to the three primary colors are supplied to a digital-to-analog (D/A) converter 36. For example, the D/A converter 36 is constituted by two devices LS175 and a resistor ladder. The D/A converter 36 converts each of the three kinds of 4-bit primary color data into an analog signal, and analog primary color signals of red, green and blue are independently outputted via respective terminals 37, 38 and 39. The analog primary color signals from the terminals 37, 38 and 39 and the composite synchronizing signal C.SYNC from a terminal 35 are supplied to a monitoring receiver (not shown) so as to display a picture as shown in FIG. 3.

The CPU 12 performs the de-interleaving of the sub-codes and the error detection and correction, and the CPU 20 decodes the commands and performs the write-in to the V-RAM 28 and the re-writing of the data in the CLUT 30. For this reason, the CRTC 27 simply produces the read-out address of the V-RAM 28, and does not need to have the function of controlling the write-in to the V-RAM as in the case of the conventional graphic display processor. Hence, the CRTC 27 is constituted by two counters and has an extremely simple construction.

The clock signals E1 and Q1 for the CPU 12 which are generated from the system timing generator 32 are pulse signals respectively have a period of approximately 560 nsec and a duty cycle of 50%. Hence, the CPU 12 operates with a machine cycle shown in FIG. 17(B) with respect to the clock signal E1 shown in FIG. 17(A). In addition, the address decoder 17 can operate during the high-level period of the clock signal E1. The selector 18 couples the address bus 16 and the address decoder 17 to the RAM 15 during the low-level period of the clock signal E2 shown in FIG. 17(C), and the selector 19 couples the data bus 13 to the RAM 15 during the low-level period of the clock signal E2. Hence, the CPU 12 makes access to the RAM 15 during a first operation time period (indicated by hatchings) of the machine cycle shown in FIG. 17(B), so as to perform the de-interleaving and the error detection and correction. Generally, the required access time of the RAM is in the order of 100 nsec, and the first operation time period which is approximately 280 nsec is sufficient for the CPU 12 to make access to the RAM 15.

The clock signals E2 and Q2 for the CPU 20 which are generated from the system timing generator 32 are pulse signals obtained by inverting the pulse signals E1 and Q1, respectively. The CPU 20 operates with a machine cycle shown in FIG. 17(D) with respect to the clock signal E2 shown in FIG. 17(C). In addition, the address decoder 24 can operate during the high-level period of the clock signal E2. The selector 18 couples the address bus 23 and the address decoder 24 to the RAM 15 during the high-level period of the clock signal E2 shown in FIG. 17(C), and the selector 19 couples the data bus 21 to the RAM 15 during the high-level period of the clock signal E2. Hence, the CPU 20 makes access to the RAM 15 during a second operation time period (indicated by hatchings) of the machine cycly shown in FIG. 17(D), so as to perform the processing such as the decoding of the commands. The CPUs 12 and 20 alternately and successively mak access to the RAM 15, and the CPUs 12 and 20 can freely make access to the RAM 15 without having to discriminate the operating state thereof (that is, wherther or not an access is made to the RAM 15) and without interfering with each other. In other words there is no need to transmit and receive status signals between the CPUs 12 and 20.

Figure 17:
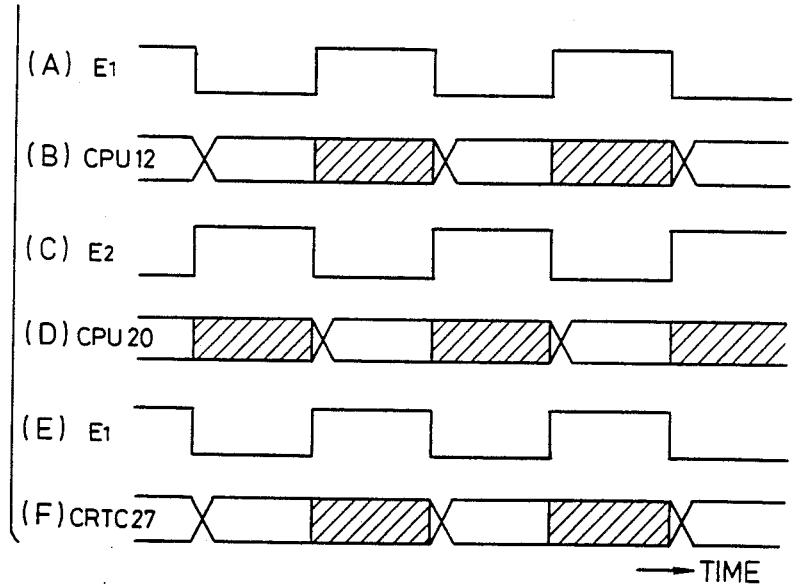
FIGS. 17(A) through 17(F) and FIGS. 18(A) through 18(D) respectively are timing charts for explaining operating states of the circuits in the block system shown in FIG. 1.

The clock signal E1 shown in FIG. 17(E) which is in units of four dots and is supplied to the CRTC 27 from the system timing generator 32 is identical to the clock signal E1 of the CPU 12. The CRTC 27 operates responsive to the clock signal E1 with a cycle shown in FIG. 17(F). The selector 25 supplies the output address of the CRTC 27 to the V-RAM 28 during the low-level period of the clock signal E2. On the other hand, during the high-level period of the clock signal E2, the selector 25 couples the address bus 23 and the V-RAM 28 and supplies the address of the CPU 20 to the V-RAM 28. As a result, the CRTC 27 makes access to the V-RAM to read out data therefrom during a first operation time period (indicated by hatchings) of the cycle shown in FIG. 17(F). The timing with which the CRTC 27 makes access to the V-RAM 28 is identical to the timing with which the CPU 12 makes access to the RAM 15. In addition, the CPU 20 makes access to the V-RAM 28 to write data therein during a second operation time period (indicated by hatchings) of the machine cycle shown in FIG. 17(D). In other words, the CPU 20 and the CRTC 27 alternately and successively make access to the V-RAM 28 without having to discriminate operating states thereof (that is, whether ornot an access is made to the V-RAM 28) and without interfering with each other.

The sub-codes applied to the terminal 10 are interleaved. However, for convenience' sake, it can be regarded that the sub-codes are applied to the terminal 10 in units of one pack, that is, in a sequence of an i-th pack, (i+1)-th pack, ..., as shown in FIG. 18(A). It takes approximately 3.3 msec to receive the sub-codes amounting to one pack. The sub-codes applied to the terminal 10 are successively stored in a storage region within the sub-code data region of the RAM 15, and when the receipt of the i-th pack is completed, the sub-codes are transferred to the operation region within the sub-code data region in a predetermined sequence and de-interleaved. The error detection and correction of the i-th pack which is obtained in this manner are performed during the time period in which the (i+1)-th pack is received, as shown in FIG. 18(B). The i-th pack which has been subjected to the error detection and correction is transferred from the operating region to the pack data regions 0 through 3 within the RAM 15 to which the CPUs 12 and 20 can make access. The CPU 20 decodes the command in the i-th pack. For example, in the case where the command instructs the display in fonts, the picture data of the i-th pack in the pack data regions 0 through 3 are transferred to the V-RAM 28. The processing of the i-th pack such as the decoding of the command which is performed by the CPU 20, is performed during the time period in which the error detection and correction of the (i+1)-th pack are performed by the CPU 12, as shown in FIG. 18(C). During this time period in which the error detection and correction of the (i+1)-th pack are performed by the CPU 12, the (i+2)-th pack is received from the terminal 10. As shown in FIG. 18(D), the picture in accordance with the command of the i-th pack is displayed at a time slightly after the decoding of the command of the i-th pack performed by the CPU 20. This slight time delay is introduced by the picture data output circuit 33, the CLUT 30, the D/A converter 36 and the like.

Figure 18:
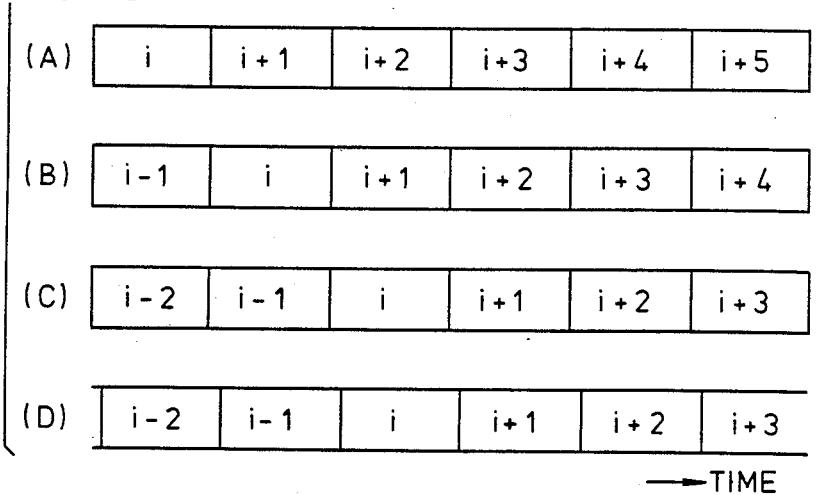

As may be seen from FIG. 18, the sub-codes (picture data) applied to the terminal 10 are subjected to a pipeline processing by the CPUs 12 and 20, the CRTC 27 and the like. As a result, the picture information can be processed at a high speed, and it is possible to perform the graphic display in accordance with the instruction of the incoming sub-codes in real time.

Further, the present invention is not limited to these embodiments, but various variations and modifications may be made without departing from the scope of the present invention.

What is claimed is:

1. A picture producing apparatus comprising:
   a first central processing unit for receiving an information which is transmitted and comprises a series of packs of information, for arranging each pack into a predetermined format, and for performing an error detection and an error correction with respect to each pack to obtain a picture information and writing the picture information into a first memory;
   a second central processing unit for decoding control data of the picture information stored in said first memory and writing picture data of the picture information into a second memory;
   picture data read-out means for successively reading out the picture data stored in said second memory;
   timing generator means for producing clock signals for said first and second central processing units and said picture data read-out means, said clock signals being representative of first and second operation time periods which are mutually exclusive;
   selector means responsive to the clock signal for coupling said first central processing unit to said first memory and coupling said picture data read-out means to said second memory exclusively in the first operation time period and for coupling said second central processing unit to said first and second memories exclusively in the second operation time period so that said second central processing unit performs the decoding and writing with respect to a first pack of said series of pack while said first central processing unit performs the error detection and the error correction with respect to a second pack following said first pack and receives and arranges a third pack following said second pack;
   color converting means for converting the picture data read out by said picture data read-out menas into color data; and
   digital-to-analog converter means for converting the color data into an analog video signal.

2. A picture producing apparatus as claimed in claim 1 in which said timing generator means comprises an oscillator, a freuqency divider for frequency-dividing an output signal of said oscillator, and a phase shifter for shifting the phase of an output signal of said frequency divider.

3. A picture producing apparatus as claimed in claim 2 in which said frequency divider and said phase shifter are constituted by a plurality of flip-flops.

4. A picture producing apparatus as claimed in claim 1 in which said picture data read-out means comprises latch circuit means for latching horizontal and vertical position data from said second central processing unit, a horizontal counter for loading the horizontal position data from said latch circuit means for every one horizontal scanning period and for counting the clcok signal from said timing generator means, a vertical counter for loading the vertical position data from said latch circuit means for every one vertical scanning period, and an operation circuit for producing an address of said second memory by performing a predetermined calculation on counted values in said horizontal and vertical counters.

5. A picture producing apparatus as claimed in claim 4 in which said operation circuit comprises a multiplier for multiplying a maximum counted value in said horizontal counter to the counted value in said vertical counter, and an adder for adding the counted value in said horizontal counter to an output value of said multiplier.

6. A picture producing apparatus as claimed in claim 1 in which said second memory stores picture data amounting to 300 x 216 dots in horizontal and vertical directions, respectively, where each dot is described by four bits.

7. A picture producing apparatus as claimed in claim 1 in which said color converting means comprises picture data output means for successively outputting for every dot the picture data which amount to four dots and are read out from said second memory in parallel, latch means for holding picture data of a border color, switching means for switching and outputting the picture data from said picture data output means and the picture data of the border color, and color look up table means to which an access is made by the picture data from said switching means for producing the color data.

8. A picture producing apparatus as claimed in claim 7 in which said picture data output means comprises variable length shift register means.

9. A picture producing apparatus as claimed in claim 7 in which said latch means latches the picture data of the border color supplied from said second central processing unit.

10. A picture producing apparatus as claimed in claim 7 in which said color look up table meand contains color data which are re-written by said second central processing unit.

* * * * *